United States Patent Office 3,164,575
Patented Jan. 5, 1965

3,164,575
POLYMERS OF ALKENYL NAPHTHALENE AND METHOD OF MAKING SAME
Frank J. Welch and Charles W. McGary, Jr., South Charleston, W. Va., assignors to Union Carbide Corporation, a corporation of New York
No Drawing. Filed June 18, 1958, Ser. No. 742,703
10 Claims. (Cl. 260—93.5)

This invention relates to the production of novel crystalline naphthalene containing polymers. More specifically this invention relates to the production of crystalline naphthalene polymers from monomers having the following general formula:

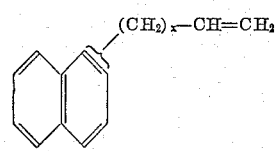

wherein $x$ is an integer from 0 to about 12 and the alkylene radical can be attached to position 1 or 2 of the naphthalene ring. The preferred monomers are those wherein the alkenyl radical contains from 2 to 6 carbon atoms and is attached to the 1 position of the naphthalene ring.

A few illustrative examples of the monomers which can be used to produce the novel polymers of this invention includes: 1-allylnaphthalene; 4-(2-naphthyl)-1-butene; 4-(1-naphthyl) - 1 - butene; 6-(1-naphthyl)-1-hexene; 9-(2-naphthyl)-1-nonene; and the like. Copolymers can also be prepared by polymerizing mixtures of the above monomers with each other or with other polymerizable monomers having an alpha-olefin unsaturation such as: ethylene; butene-1; 3-methyl-1-butene; propene; styrene; 4-methyl-1-pentene; and the like.

The novel polymers of this invention can be produced by contacting the monomer with a catalyst complex in the presence of an inert liquid hydrocarbon diluent. The catalyst complex is composed of two components. The first component is a halide or oxyhalide or mixture thereof of a transition metal of Groups IV–B, V–B and VI–B of the Periodic Table of the Elements such as, for example, the transition elements vanadium, titanium, tungsten, zirconium, hafnium, niobium, tantalum, chromium, or molybdenum. Illustrative of the compounds useful in preparing the catalyst complex are: vanadium tetrachloride, vanadium trichloride, vanadium dichloride, vanadyl trichloride, vanadyl dichloride, titanium tetrachloride, titanium trichloride, titanium dichloride, zirconium tetrachloride, chromium trichloride, chromyl dichloride, titanium tetrafluoride, titanium trifluoride, titanium tetrabromide, titanium tribromide, tungsten tetrachloride, and tungsten hexachloride, and mixtures thereof. Titanium trichloride and vanadium trichloride are the preferred transition metal compounds for use in this invention.

The second component of the catalyst complex is an organo-metallic compound or metal hydride of a metal of Groups I–A, II–A, and III–A of the Periodic Table of the Elements. These compounds may be exemplified by the general formula: $R_bMR'_c$ wherein M is a metal from Groups I–A, II–A or III–A of the Periodic Table; R is hydrogen, an alkyl radical with up to 20 carbon atoms in the chain and preferably 2 to 12 carbon atoms, an aromatic hydrocarbon radical containing 6 to 12 carbon atoms, or a saturated cycloaliphatic hydrocarbon radical containing 3 to 12 carbon atoms; R' is a halogen or any of the substituents for R; $b$ is an integer from 1 to 2 inclusive; $c$ is an integer from 0 to 1 inclusive and the sum of $b$ plus $c$ equals the valence of the metal M. Illustrative of such compounds are: triisobutylaluminum, trioctyl-aluminum, tributylaluminum, triethylaluminum, triisopropylaluminum, tridodecylaluminum, triphenylaluminum, diethylaluminum chloride, diisobutylaluminum chloride, dioctylaluminum chloride, didodecylaluminum chloride, various monohydrocarbonaluminum dihydrides, diethylaluminum hydride, diisobutylaluminum hydride, dioctylaluminum hydride, didodecylaluminum hydride, diethylberyllium, diisobutylberyllium, dioctylberyllium, didodecylberyllium, diphenylberyllium, ethylberyllium chloride, isobutylberyllium chloride, octylberyllium chloride, dodecylberyllium chloride, phenyl lithium, naphthyl lithium, isobutyl lithium, cyclohexyl lithium, dodecyl lithium, diethylzinc, diisobutylzinc, dioctylzinc, didodecylzinc, diphenylzinc, ethylzinc chloride, isobutylzinc chloride, dicyclopropylzinc chloride, diisobutylmagnesium, dioctylmagnesium, didodecylmagnesium, diphenylmagnesium, isobutylmagnesium chloride, octylmagnesium chloride, and dodecylmagnesium chloride, and the like. The preferred organo-metallic cocatalysts are the trialkyl aluminum compounds having less than 13 carbon atoms in each alkyl chain such as triisobutylaluminum.

The molecular ratio of the organo-metallic compound to the transition metal compound in the catalyst complex can vary from about 0.1 to about 10 or more. The ratio employed is not narrowly critical and may be varied considerably. Thus, the polymerization works as well at higher ratios; however, a preferred molar ratio for efficiency and economic operation is from about 0.2 to about 2.0 moles of the organo-metallic compound per mole of transition metal compound. The function of these metallic complexes being that of catalysts or initiators, any catalytic amount can be used. Thus, the concentration of the catalyst complex in the liquid diluent may vary from about 0.1 millimole to 50 or more millimols of each component per liter of diluent. Higher concentrations can of course be used but they show no commensurate advantages.

The techniques used in combining the catalyst, diluent and monomer are the well known procedures designed to exclude moisture. The organo-aluminum cocatalyst can be added to the diluent in the reaction vessel prior to the addition of the metal halide cocatalyst; however, these various components can be added in reverse order also. The monomer may be introduced and the vessel then sealed with subsequent stirring of the reaction mix at the desired temperature. The reaction may then take place under autogenous pressure. Alternatively, the monomer may be introduced continuously at the desired temperature and pressure.

Pressure is not critical and is based only on practical considerations of equipment design. Polymerization can be conducted at atmospheric, superatmospheric, or subatmospheric pressure in agitator equipped vessels. Thus pressures of 0.1 atmosphere to 100 atmospheres may be used. It is preferred to use pressures of from about 1 to about 5 atmospheres. The polymerization temperature can vary over a wide range. Temperatures from about 0° C. to about 180° C. are operable while a temperature range from 25° C.–120° C. and particularly 40° C. to 80° C. is preferred.

It is preferable to maintain an inert atmosphere over the reaction medium (e.g. nitrogen). A grinding medium may also be present in the reaction mixture (e.g. glass beads) for the purpose of decimating the catalyst complex and continuously renewing exposed surfaces of the decimated particulate complex to the monomer.

The period of time during which the polymerization reaction is permitted to proceed is not critical. Thus, periods of as little as 5 minutes or less to 4 hours or 7 days can be effectively employed. The longer the reaction period, the more complete the conversion.

The inert liquid hydrocarbon diluent employed may be: (1) any inert aliphatic hydrocarbon such as heptane, hexane, cyclohexane, 2-ethylhexane; and the like; or (2) an aromatic hydrocarbon such as benzene, toluene, ortho-, meta- and paraxylene; and the like; or (3) a mixture of hydrocarbons can be used. However, the hydrocarbon diluent must be essentially free of impurities of unsaturated compounds, sulfur-containing compounds and compounds containing active hydrogen such as alcohols, amines and water. The preferred inert diluents are benzene, toluene, cyclohexane and heptane. It is desirable to have at least one percent by weight of monomer in the diluent during polymerization although the concentration may vary from about one to seventy percent or higher.

The term "stiffness" employed herein is defined as the tensional modulus which is calculated by multiplying by one hundred, the force necessary to stretch a sample of polymer one percent of its original length. Measurements of stiffness are made with an Instron Tester manufactured by Instron Engineering Company of Quincy, Massachusetts (Model 37).

The term "crystalline" as employed herein refers to a polymer containing a succession of structural units which exhibit a regular repetitive spatial arrangement over long segments or the entire length of the polymer molecule and which give a characteristic sharp X-ray diffraction pattern. This is in contrast to amorphous polymer in which the chains are irregularly coiled and yield only broad, ill defined bands on the X-ray pattern.

The melt index values given for the polymers of this invention were determined by ASTM Test Method D–1236–52T, unless otherwise indicated. Density was measured gravimetrically by using a density gradient tube. Melting point was determined by the crossed polaroid technique.

The polymers of this invention are useful in molding, extrusion, or in fiber applications.

EXAMPLE 1

The following materials were placed in a clean, dry pressure reactor bottle:

100 g. of essentially anhydrous toluene
20 g. of 1-allylnaphthalene
4.0 g. of triisobutylaluminum
1.0 g. of vanadium trichloride The bottle was then rotated in a 50° C. bath for about five days, after which time the mixture was washed with isopropanol. The poly-1-allylnaphthalene, which was insoluble in isopropanol, was recovered by filtration and when dry weighed about one gram. The polymer was molded into a plaque which was crystalline according to X-ray diffraction patterns and melted at about 300° C. (crossed polaroids). The polymer had a density of 1.135 g./cc. at room temperature and the infrared spectrum indicated that alpha-naphthyl groups were present in the polymer chain.

EXAMPLE 2

*Preparation of 4-(2-Naphthyl)-1-Butene*

Magnesium turnings (124.8 grams, 3.9 atoms) and dry ethyl ether (80 ml.) were placed in a 5 liter, 4-necked round-bottomed flask equipped with stirrer, reflux condenser, thermometer and dropping funnel. The system was arranged in such a manner that it could be kept under a nitrogen atmosphere. A solution of 2-chloromethylnaphthalene (225 grams, 1.275 mol) in 1 liter of dry ethyl ether was then added at such a rate as to maintain a gentle reflux. During the addition, the reaction mixture was diluted with a further 1620 ml. of dry ethyl ether. When the reaction was complete, the mixture was filtered in a dry box under a nitrogen atmosphere. Analysis of the filtered Grignard solution indicated a 70 percent yield. The filtered Grignard solution was added to allyl chloride (92 grams, 1.2 mol) in the apparatus described above. After standing overnight saturated ammonium chloride solution (1 liter) was added. The organic layer was washed with more ammonium chloride solution, then with water and finally dried over anhydrous calcium chloride. After the ether was evaporated, the residue was fractionally distilled at reduced pressure. The material boiling above 152° C. at 19 mm. was refractionated and product was collected at 147° C. at 10 mm. pressure. Infrared analysis indicated the presence of some alcohol groups which were removed by treatment with silica gel.

The following materials were placed in a clean, dry, glass tube:

25 ml. of essentially anhydrous toluene
5 g. of 4-(2-naphthyl)-1-butene
1.0 g. of triisobutylaluminum
0.3 g. of vanadium trichloride The tube was rotated in a 50° C. bath for five days, after which time the mixture was worked up as described in Example 1. A four-gram yield of poly-4-(2-naphthyl)-1-butene was obtained. The polymer was molded into a plaque which was crystalline according to X-ray diffraction patterns and had a density of 1.146 g./cc. at room temperature. The polymer melted at 193–201° C. according to crossed polaroids. The stiffness temperature relation was found to give a melting point of about 220° C.

| Temperature, °C.: | Stiffness, p.s.i. |
|---|---|
| 25 | 213,000 |
| 40 | 185,000 |
| 50 | 123,200 |
| 60 | 41,200 |
| 80 | 8,390 |
| 120 | 1,060 |
| 200 | 204 |
| 220 | 28 |

EXAMPLE 3

The following materials were placed in a clean, dry bottle:

100 ml. of essentially anhydrous toluene
21 g. of 2-vinylnaphthalene
4.0 g. of triisobutylaluminum
1.5 g. of vanadium trichloride The bottle was rotated in a 50° C. bath for 11 days, after which time the mixture was worked up as described in Example 1.

A two-gram yield of poly-2-vinylnaphthalene was obtained. This polymer had a density of 1.093 g./cc. at 25° C.

EXAMPLE 4

The following materials were placed in a clean, dry bottle:

20 ml. of essentially anhydrous toluene
5 g. of 4-(1-naphthyl)-1-butene
1.5 g. of triiosbutylaluminum
0.5 g. of vanadium trichloride The bottle was rotated in a 50° C. bath for 14 hours, after which time the mixture was worked up as described in Example 1. A yield of 1½ grams of poly-4-(1-naphthyl)-1-butene was obtained. The polymer was crystalline (X-ray diffraction); melted at 203° C.; and had a density of 1.1350 g./cc. at 25° C.

What is claimed is:

1. Solid crystalline polymers of alkenyl naphthalene, said polymers being a polymerization product of monomers represented by the following general formula:

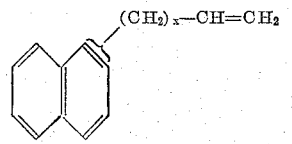

wherein $x$ is an integer having a value of 1 to about 12.

2. As a new composition of matter solid, crystalline poly-1-allylnaphthalene having a melting point of about 300° C. and a density of 1.135 grams per cubic centimeter at room temperature.

3. As a new composition of matter solid, crystalline poly-4-(2-naphthyl)-1-butene having a melting point of about 193° C. to about 201° C. and a density at room temperature of 1.146 grams per cubic centimeter.

4. The process for polymerizing monomers having the general formula:

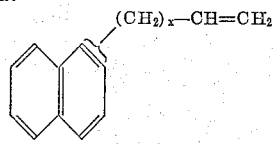

wherein $x$ is an integer from 1 to about 12, to solid crystalline materials which comprises polymerizing said monomers by admixing said monomers with a slurry of an inert liquid hydrocarbon diluent containing a catalytic amount sufficient to catalyze the reaction of a catalyst complex comprising: a halide of a transition metal selected from the group consisting of the metals of Groups IV–B, V–B, and VI–B of the Periodic Table and an organo-metallic compound represented by the general formula: $R_bMR'_c$, wherein M is a metal selected from the group consisting of metals from Groups I–A, II–A, and III–A of the Periodic Table; R is a member selected from the group consisting of hydrogen, alkyl radicals containing up to about 20 carbon atoms in the alkyl chain, aromatic hydrocarbon radicals containing from 6 to about 12 carbon atoms, and saturated cycloaliphatic hydrocarbon radicals containing from 3 to about 12 carbon atoms; R' is a member selected from the group consisting of hydrogen, alkyl radicals containing up to about 20 carbon atoms, in the alkyl chain, aromatic hydrocarbon radicals containing 6 to 12 carbon atoms saturated, cycloaliphatic hydrocarbon radicals containing from 3 to about 12 carbon atoms and halogen atoms; $b$ is an integer having a value of 1 to 2; $c$ is an integer having a value of 0 to 1; and the sum of $b$ plus $c$ equals the valence of the metal M.

5. The process for forming solid crystalline polymers from monomers represented by the general formula:

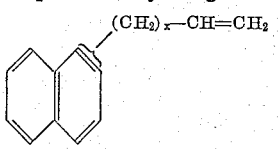

wherein $x$ is an integer of from 1 to about 12, which comprises polymerizing said monomers by admixing said monomers with a slurry of an inert liquid hydrocarbon diluent containing a catalytic amount sufficient to catalyze the reaction of a catalyst complex comprising a vanadium chloride and a trialkyl aluminum compound wherein the alkyl groups have up to about 20 carbon atoms.

6. The process of claim 5 wherein said catalyst complex comprises a titanium chloride and a trialkyl aluminum compound.

7. The process for polymerizing 1-allylnaphthalene to a crystalline polymer which comprises polymerizing said naphthalene monomer by admixing said monomer with a slurry of an inert liquid hydrocarbon diluent containing a catalytic amount sufficient to catalyze the reaction of a catalyst complex comprising triisobutylaluminum and vanadium trichloride.

8. The process for polymerizing 4-(2-naphthyl)-1-butene to a solid, crystalline material which comprises polymerizing said butene monomer by admixing the monomer with a slurry of an inert liquid hydrocarbon diluent containing a catalytic amount sufficient to catalyze the reaction of a catalyst complex comprising triisobutylaluminum and vanadium trichloride.

9. A normally solid homopolymer of 4-(1-naphthyl)-1-butene.

10. A method for producing a normally solid polymer by polymerizing in contact with a titanium halide and aluminum tri-lower alkyl catalyst system a 4-(1-naphthyl)-1-butene.

References Cited in the file of this patent
UNITED STATES PATENTS

| | | |
|---|---|---|
| 1,982,676 | Lawson | Dec. 4, 1934 |
| 2,145,501 | Waterman et al. | Jan. 31, 1939 |
| 2,318,742 | Britton et al. | May 11, 1943 |
| 2,349,136 | Britton et al. | May 16, 1944 |
| 2,456,558 | Glick | Dec. 14, 1948 |
| 2,521,754 | Shusman | Sept. 12, 1950 |
| 2,842,531 | Baxter | July 8, 1958 |

FOREIGN PATENTS

| | | |
|---|---|---|
| 526,101 | Italy | May 14, 1955 |

OTHER REFERENCES

Zal'kind et al.: J. Gen. Chem. (U.S.S.R.), 6, pp. 988–98 (1936).

Zal'kind et al.: Chem. Abs., page 676, vol. 31 (1937).